No. 710,906. Patented Oct. 7, 1902.
A. W. TERRILL.
HANDLE BOLT.
(Application filed Jan. 24, 1902.)
(No Model.)
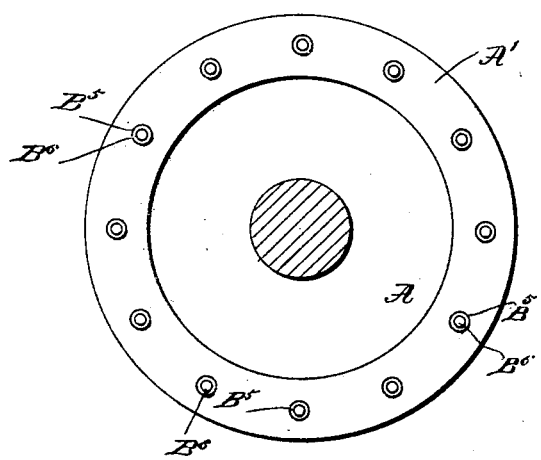
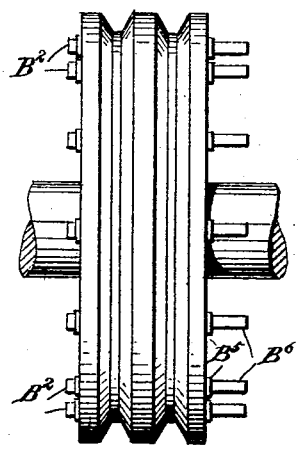
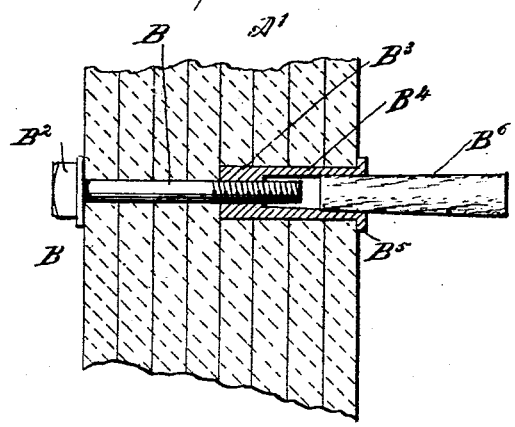
WITNESSES:
H. W. Walker
INVENTOR
Asa Wiser Terrill.
BY
ATTORNEYS

UNITED STATES PATENT OFFICE.

ASA WISER TERRILL, OF SALEM, WEST VIRGINIA.

HANDLE-BOLT.

SPECIFICATION forming part of Letters Patent No. 710,906, dated October 7, 1902.

Application filed January 24, 1902. Serial No. 91,052. (No model.)

*To all whom it may concern:*

Be it known that I, ASA WISER TERRILL, a citizen of the United States, and a resident of Salem, in the county of Harrison and State of West Virginia, have invented a new and Improved Handle-Bolt, of which the following is a full, clear, and exact description.

The object of the invention is to provide a new and improved handle-bolt more especially designed for use on sectional wooden rims of bull-wheels employed in gas and oil well drilling machines, the bolts being arranged to securely fasten the rim-sections together and to provide convenient handles for turning the wheel.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a face view of a bull-wheel upon which the improvement is applied. Fig. 2 is an edge view of the same. Fig. 3 is an enlarged sectional plan view of the improvement as applied.

The sections of the wooden rim A' of the wheel A are secured together by bolts B, preferably arranged in a circle and spaced equidistant apart and extending in a transverse direction, as plainly indicated in Fig. 3, to securely fasten the rim-sections together. Each of the bolts B is provided with a shank B', provided on its outer end with a head $B^2$, abutting against one face of the rim A', and the other end of the said shank B' is threaded and screws in a nut $B^3$, having an elongated extension $B^4$, with an elongated open socket in its outer end, said socketed nut fitting into a recess in one of the rim-sections, as indicated in Fig. 3. The outer end of the extension $B^4$ is formed with an outwardly-extending flange $B^5$, resting on the face of the rim A', and in the extension $B^4$ is driven or otherwise secured a handle $B^6$, projecting a distance from the face of the rim A' to allow the operator to conveniently take hold of the handle $B^6$ to rotate the wheel A. By the arrangement described the sections of the rim A' are securely held together by the bolts, and the latter form a convenient means to turn the wheel by hand.

Having thus described my invention, I claim as new and desire to secure by Letters Patent—

1. A handle-bolt comprising a screw-threaded shank having a head, and a screw-threaded nut having an elongated open-ended socket formed on its outer end, and a rigidly-attached handle seated in said socket and arranged in alinement with the screw-threaded shank, substantially as and for the purpose described.

2. A handle-bolt comprising a screw-threaded shank having a head, and a screw-threaded nut having an elongated open-ended socket formed on its outer end and having at this point an outwardly-turned flange of greater diameter, and a rigidly-attached handle seated in said socket and arranged in alinement with the screw-threaded shank, substantially as and for the purpose described.

In testimony whereof I have signed my name to this specification in the presence of two witnesses.

ASA WISER TERRILL.

Witnesses:
H. B. MCKINLEY,
PRICE L. HAYMOND.